(12) United States Patent
Parsons et al.

(10) Patent No.: US 6,748,968 B1
(45) Date of Patent: Jun. 15, 2004

(54) METHOD AND APPARATUS FOR COMBINED CONDUIT/ELECTRICAL-CONDUCTOR JUNCTION INSTALLATION

(75) Inventors: Natan E. Parsons, Brookline, MA (US); David W. Hadley, Franklin, MA (US)

(73) Assignee: Arichell Technologies, Inc., West Newton, MA (US)

( * ) Notice: Subject to any disclaimer, the term of this patent is extended or adjusted under 35 U.S.C. 154(b) by 385 days.

(21) Appl. No.: 09/596,251

(22) Filed: Jun. 16, 2000

(51) Int. Cl.[7] .................... F16K 43/00; F16L 41/06
(52) U.S. Cl. .................. 137/318; 137/15.13; 222/83; 222/83.5
(58) Field of Search ................ 137/318, 15.13, 137/15.14; 174/68.1; 222/83, 83.5; 439/387, 417, 418, 443

(56) References Cited

U.S. PATENT DOCUMENTS

| | | | | |
|---|---|---|---|---|
| 2,222,932 A | | 11/1940 | Bennett ..................... 174/10 |
| 3,131,712 A | * | 5/1964 | Risley et al. ............... 137/318 |
| 4,153,326 A | | 5/1979 | Frantz ......................... 339/99 |
| 4,204,559 A | | 5/1980 | Wagner ....................... 137/318 |
| 4,216,793 A | | 8/1980 | Volgstadt .................... 137/318 |
| 4,288,654 A | | 9/1981 | Blom .......................... 174/47 |
| 4,540,011 A | * | 9/1985 | Croxford et al. ........... 137/318 |
| 4,552,170 A | | 11/1985 | Margrave ................... 137/318 |
| 4,808,767 A | | 2/1989 | Colbachini ................. 174/47 |
| 4,854,887 A | | 8/1989 | Blandin ...................... 439/194 |
| 5,109,534 A | | 4/1992 | Naito ........................... 455/66 |
| 5,241,981 A | * | 9/1993 | Ahern ........................ 137/318 |
| 5,256,844 A | | 10/1993 | Grosvik ................... 219/10.51 |
| 5,334,801 A | | 8/1994 | Mohn ........................... 174/47 |
| 5,345,964 A | * | 9/1994 | Friedel ....................... 137/318 |
| 5,348,045 A | * | 9/1994 | Serve ......................... 137/318 |
| 5,416,270 A | | 5/1995 | Kanao ......................... 174/47 |
| 5,442,810 A | | 8/1995 | Jenquin ...................... 455/66 |
| 5,456,279 A | | 10/1995 | Parsons ..................... 137/245 |
| 5,457,594 A | | 10/1995 | Stoll et al. ................. 361/160 |
| 5,568,794 A | | 10/1996 | Tabuchi .................... 123/195 |
| 5,611,365 A | | 3/1997 | Maichel ..................... 137/15 |

FOREIGN PATENT DOCUMENTS

| | | |
|---|---|---|
| DE | 19827883 A | 1/2000 |
| GB | 2003570 A | 3/1979 |

OTHER PUBLICATIONS

PCT International Search Report dated Dec. 12, 2001.

\* cited by examiner

*Primary Examiner*—George L. Walton
(74) *Attorney, Agent, or Firm*—Foley Hoag LLP

(57) ABSTRACT

A combination junction provides a fluid, electrical-power and control-signal connections. A combination tap comprises a flow probe that pierces a main conduit when it is attached to it. It thereby provides fluid communication between a tap conduit and the main conduit. The combination tap also includes one or more tap electrical conductors to tap electrical conductors embedded in the main-conduit wall.

72 Claims, 10 Drawing Sheets

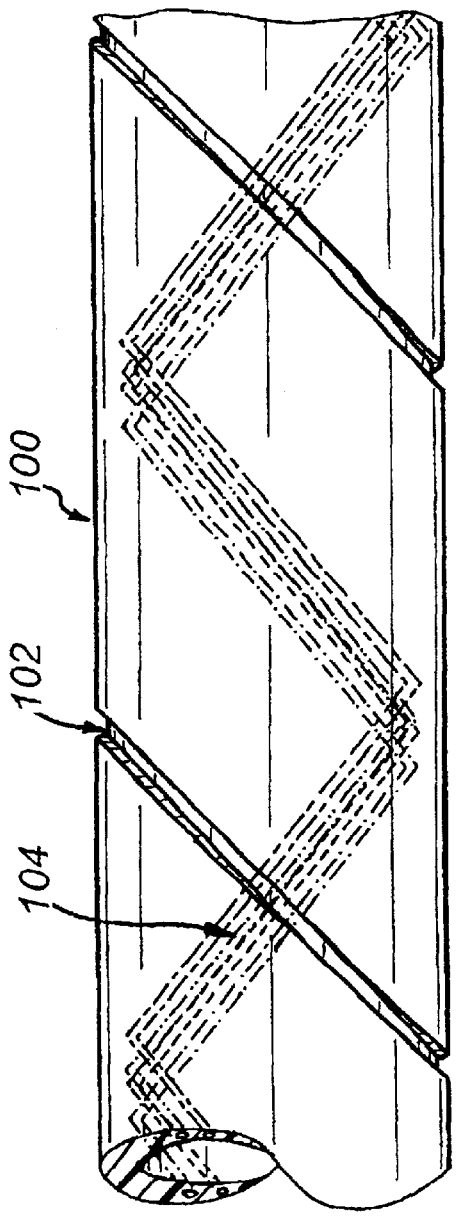
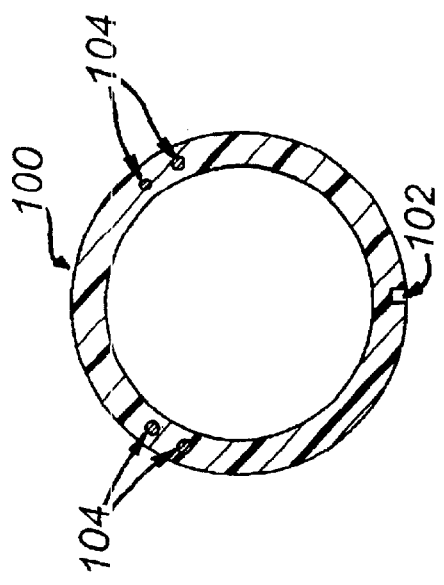

METHOD AND APPARATUS FOR COMBINED CONDUIT/ELECTRICAL-CONDUCTOR JUNCTION INSTALLATION

BACKGROUND OF THE INVENTION

1. Field of the Invention

The present invention is directed to providing fluid communication from a common source to multiple locations or from multiple locations to a common destination. It is directed particularly to arrangements in which electrical power and/or electrical control signals from a remote source are used in controlling flow to or from the multiple locations individually.

2. Background Information

In many control systems a fluid from a common source must be delivered to a multiplicity of stations, where the fluid's flow is individually controlled. The control mechanism is typically some electrically operated valving scheme. In some roller-type conveyer systems, for instance, pressurized gas drives conveyor rollers, and respective electrically operated valves individually control the fluid's flow through conduits that deliver the pressurized gas to respective rollers. The circuits that operate the valves require electrical power and may respond to control signals. For example, object detectors may detect objects on the conveyor at their respective locations, and corresponding valve-operating circuits may respond by allowing fluid flow that drives the rollers at the detected objects' locations.

Such conveyor systems have been employed for generations, and for just as long an inordinate proportion of such systems' installation cost has been the conduits to the individual stations and the electrical connections to their respective electrically operated valves and control systems.

As another example, lawn irrigation systems currently employ a dual conduit system, whereby one conduit that in a pipe form is used for the transfer of water from the source to various outlet points, which are controlled by solenoid valves. The second conduit is typically a multi-conductor copper line, which is used to provide said solenoid valves with the electrical power and control signals needed for operation.

SUMMARY OF THE INVENTION

We have realized that such costs can be reduced substantially by employing a combination electrical fluidic junction in a main fluid conduit that additionally carries electrical conductors. The combination junction includes a combination tap. The combination tap includes a flow probe that pierces the main conduit when it is attached to it. By piercing the tap, it provides a fluid communication between the main conduit and a tap conduit. The combination tap also includes one or more tap electrical conductors to tap the electrical conductors that the main conduit supports. An attachment mechanism may be included in the combination tap to attach it to the conduit. Other features and advantages will be apparent in the detailed description to follow.

BRIEF DESCRIPTION OF THE DRAWINGS

The invention description below refers to the accompanying drawings, of which:

FIG. 1a is a side view of a main conduit carrying a fluid and electrical conductors;

FIG. 1b is a cross-sectional view of the main conduit;

DETAILED DESCRIPTION OF AN ILLUSTRATIVE EMBODIMENT

FIG. 1a shows a common main conduit 100 intended to conduct a fluid to a plurality of local stations. As used here, the term fluid means anything that can be made to flow. For example, the fluid may be a slurry or other material that is not strictly a gas or liquid. The fluid will typically be a power-transmission medium, such as hydraulic fluid or pressurized air, but it may have some other purpose instead. For example, it may be to conduct water.

The main conduit 100 is preferably continuous, semi-flexible, and made of an insulating material such as a thermoplastic resin. An alignment notch 102 runs in a longitudinal direction along the conduit's outer wall, for a purpose that will soon be apparent. Electrical conductors 104 are embedded in the conduit wall (best shown in FIG. 1b) or otherwise supported by it.

For the sake of example, let us assume that the main conduit 100 delivers pressurized air to different conveyor-line stations, at which the pressurized air drives respective sets of conveyor rollers. Also for the sake of example, let us assume that electrically operated valves at each station control the pressurized air's application to the rollers. The electrical conductors 104 may be used to deliver electrical power to local valve-drive circuitry and/or conduct control signals to it from remote control circuitry.

Figure 2A:
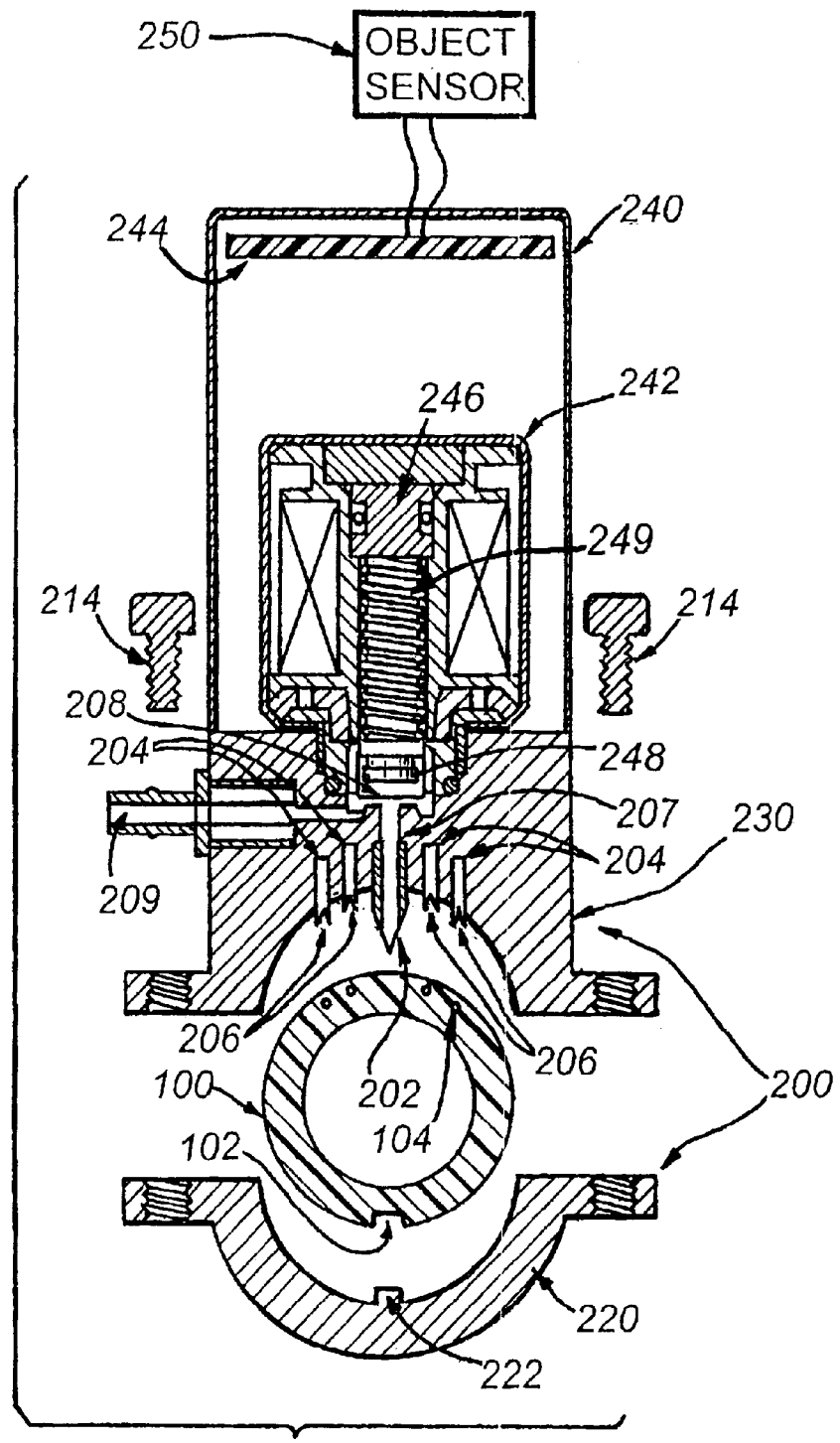
FIG. 2a is a cross-sectional view of a combination tap including a valve-control module, wherein the combination tap is in an open position and not yet attached to the main conduit.
Figure 2B:
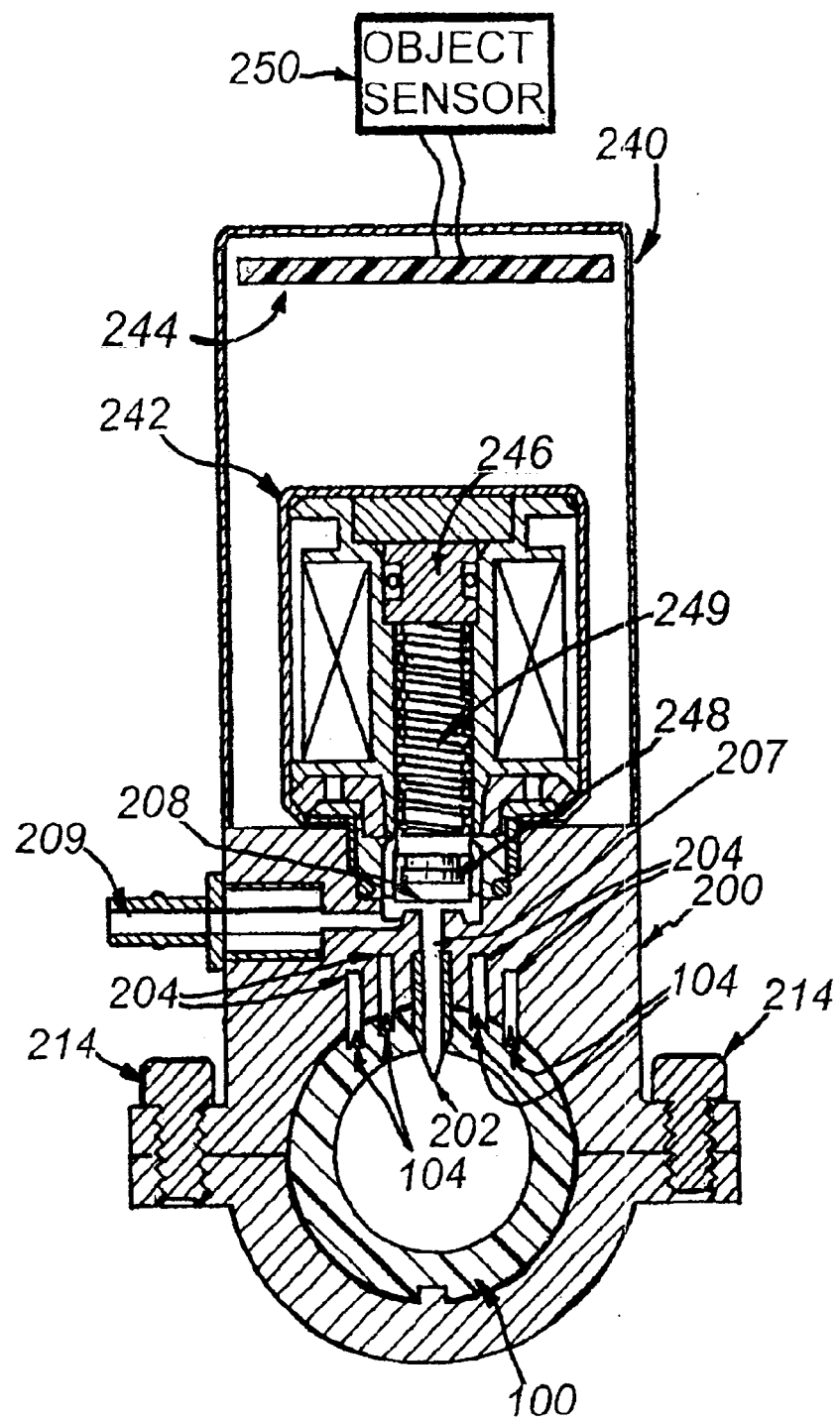
FIG. 2b is a cross-sectional view of the combination tap as attached.

FIG. 2a shows a combination tap 200 (on which a valve-control module 240 is secured) that taps into both the fluid and the electrical conductors in accordance with the present invention so as to provide both fluid and electrical communication between the main conduit 100 and the local station. The combination tap 200 comprises a main flow probe 202 and one or more tap electrical conductors 204 for this purpose. The combination tap 200 further comprises an attachment mechanism, which in the exemplary embodiment takes the form of a lower bracket 220 and screws 214 that secure the combination tap 200 to the main conduit 100 as FIG. 2b illustrates. As FIG. 2a shows, the lower bracket 220 includes a key 222 that mates with the main conduit 100's notch 102 when the lower bracket 220 is brought into position. The combination tap's upper assembly 230 is then fastened to the lower bracket 220. As mentioned, screws 214 are used for this purpose. As the screws 214 are tightened to secure the combination tap 200 to the main conduit 100, the flow probe 202 and the tap electrical conductors 204 pierce the conduit wall until they reach the positions that FIG. 2b illustrates. Because of key 222's mating with the main conduit notch 102, the tap electrical conductors 204 properly align with the main conduit's electrical conductors 104 as shown.

Each of the tap electrical conductors 204 ends in a conduit-piercing tip 206, such as a forked blade of the type commonly used for insulation-displacement connectors. The main flow probe 202 pierces all the way into the main passage to create a flow-tap opening in it. This wall-piercing flow probe 202 itself acts as part of a tap conduit 207, which forms a tap passage with which the main passage communicates. In this approach, the tap conduit's tap passage necessarily comes into communication with the main conduit's passage simultaneously with the flow-tap opening's creation.

A valve-control module 240 containing an electrically controlled valve 242 coupled to a valve-drive circuit 244 is secured in an opening at the upper assembly 230 to control the fluid flow through the flow probe 202. Through electrical connections not shown in the drawings, the tap electrical conductors 204 forward electrical power and control signals from the main electrical conductors 104 to the valve-drive circuit 244, which controls the control valve 242. The control valve 242 comprises a solenoid 246 at the tip of whose armature a valve member 248 is attached.

When the solenoid 246 is not activated, a spring 249 causes the seat member 248 to seat at the opening of the tap conduit 207 to prevent the fluid from entering a chamber 208 situated in the combination tap 200. An appropriate control signal from the valve-drive circuit 244 activates the solenoid 246, which acts against the spring force to lift the valve member 248 from the opening of the tap conduit 207 and allow the fluid to flow out of the tap conduit 207 and into the chamber 208. The fluid then passes through the chamber 208 and out through an outlet 209. Note that the valve-drive circuit 244 need not be in the vicinity of the control valve 242 as illustrated; it may be remote, sending control signals remotely.

When the control valve 242 opens in the conveyor example, the fluid flows from the outlet 209 and powers the respective conveyor rollers. Embodiments of the invention will often operate in response to sensor signals of some sort. Examples are signals from sensors of force, pressure, moisture, and light. In the illustrated embodiment, the sensor is an object sensor 250. That sensor monitors a target region for objects and applies the valve control signals to the valve-drive circuit 244 in response to the predetermined characteristics of the objects detected. The drawing depicts the object sensor 250 as separate from the valve module 240, but it may instead be mounted on or in it.

Figure 2C:
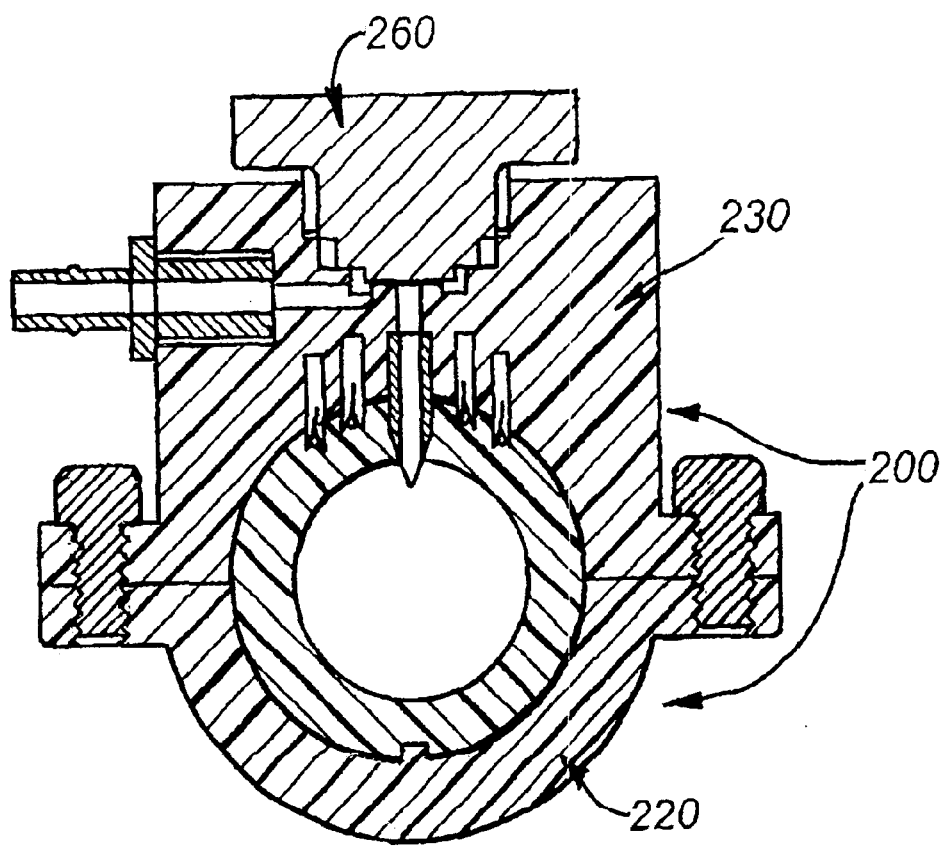
FIG. 2c is a cross-sectional view of the combination tap, wherein the valve-control module is replaced with a plug.

If a need later arises to change the valve module's 240 location on the main conduit 100, perhaps due to modification or expansion of the system, the valve module 240 is removed, and a filler plug 260 is inserted to seal the opening that it leaves, as FIG. 2c illustrates.

Figures 3A, 3B:
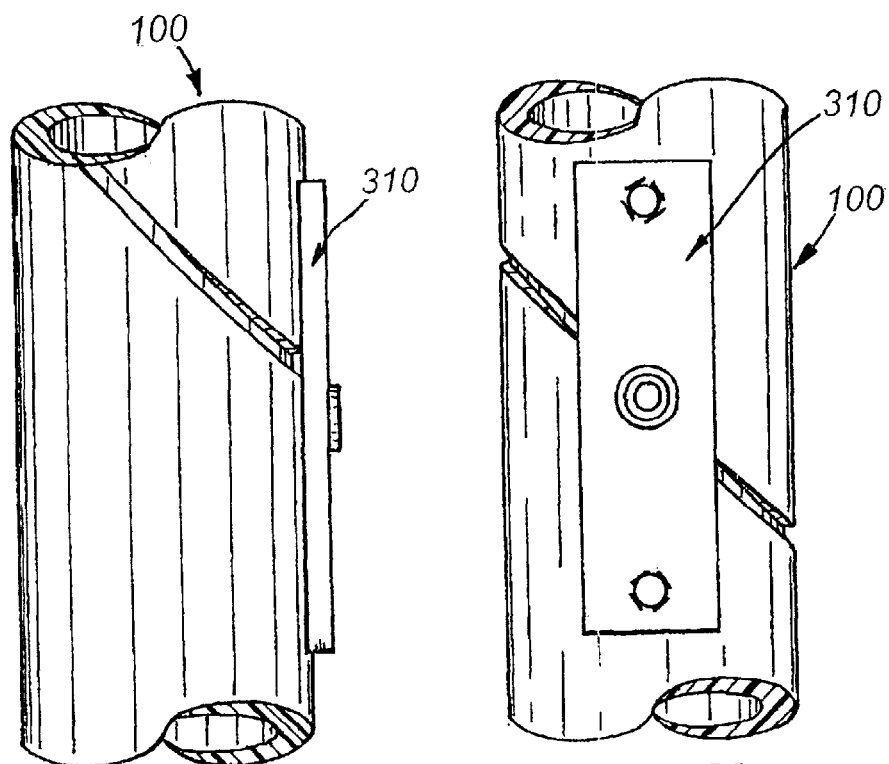
FIG. 3a is a side view of a bracket that includes a flow probe.
FIG. 3b is a top view of the bracket.
Figures 3C, 4:
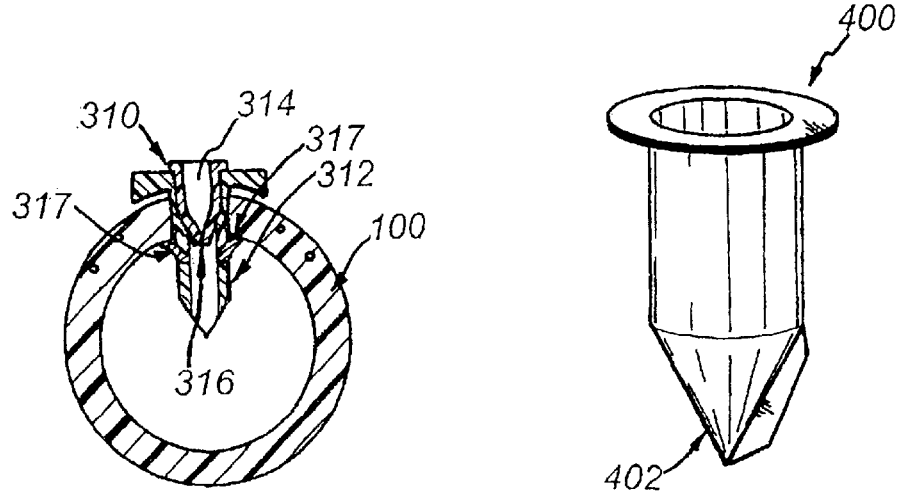
FIG. 3c is a cross-sectional view of the bracket, wherein the flow probe is shown with more details.
FIG. 4 illustrates a duck-bill check valve that may be used in the flow probe above.

Valve-module 240 removal in the embodiment of FIGS. 2a–2c may necessitate a main-conduit shutdown. But this is not a necessary result of employing the present invention's teachings. For example, FIGS. 3a–c illustrate an arrangement in which the conduit 100 is punctured by a flow probe 312 that is installed before the rest of the combination tap 300 is secured. As FIGS. 3a–3c show, the flow probe 312 may be mounted on a bracket 310 and comprise a duckbill-type check valve 314. Such valves are of the general type used, for instance, in footballs and are available from sources such as Vernay Laboratories of Yellow Springs, Ohio. Such a check valve 314 has resilient lips 316 that form a slit. The slit tends to close against the flow through the flow-probe passage in the direction away from the main passage. It thereby effectively prevents the fluid from flowing out when the flow probe 312 is initially installed. FIG. 4 illustrates such a duck-bill check valve 400 with resilient lips 402. Pliers or a similar tool may be used to install the bracket 310.

As FIG. 3c shows, the flow probe 312 has a resilient retainer 317 at the outer surface that locks the bracket 310 to the main conduit 100 as the probe pierces it. Once locked, the retainer 317 may further act as a seal to prevent the fluid from leaking at the edges of the created opening at the main conduit 100.

As shown in FIGS. 5a–5d, the rest of the combination tap (upper assembly 512) is then secured on top of the bracket 310 with screws 520. This brings the tap electrical conductors 514 into communication with the electrical conductors 104 of the main conduit 100. At the same time, a needle 516 (see FIGS. 5c–5d) in the upper combination tap assembly 512 extends into the flow probe 312, so parting the check valve's lips 316 as to extend the tap passage through the slit and into communication with the main passage of the main conduit 100. The needle 516 has a single control passage that allows the fluid to flow through it and into the chamber.

Figure 5A:
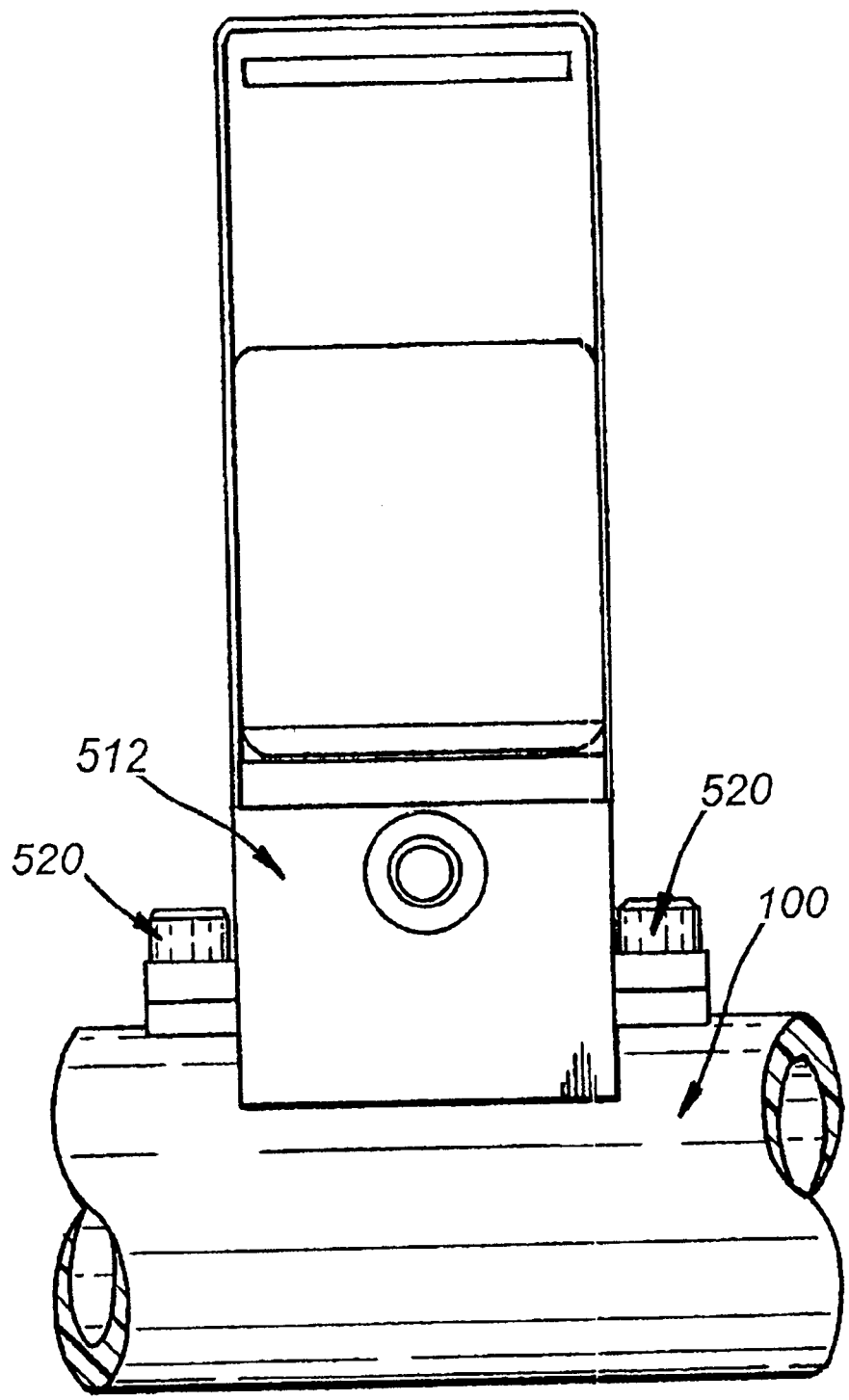
FIG. 5a is a side of an alternative combination tap including a control-valve module.
Figure 5B:
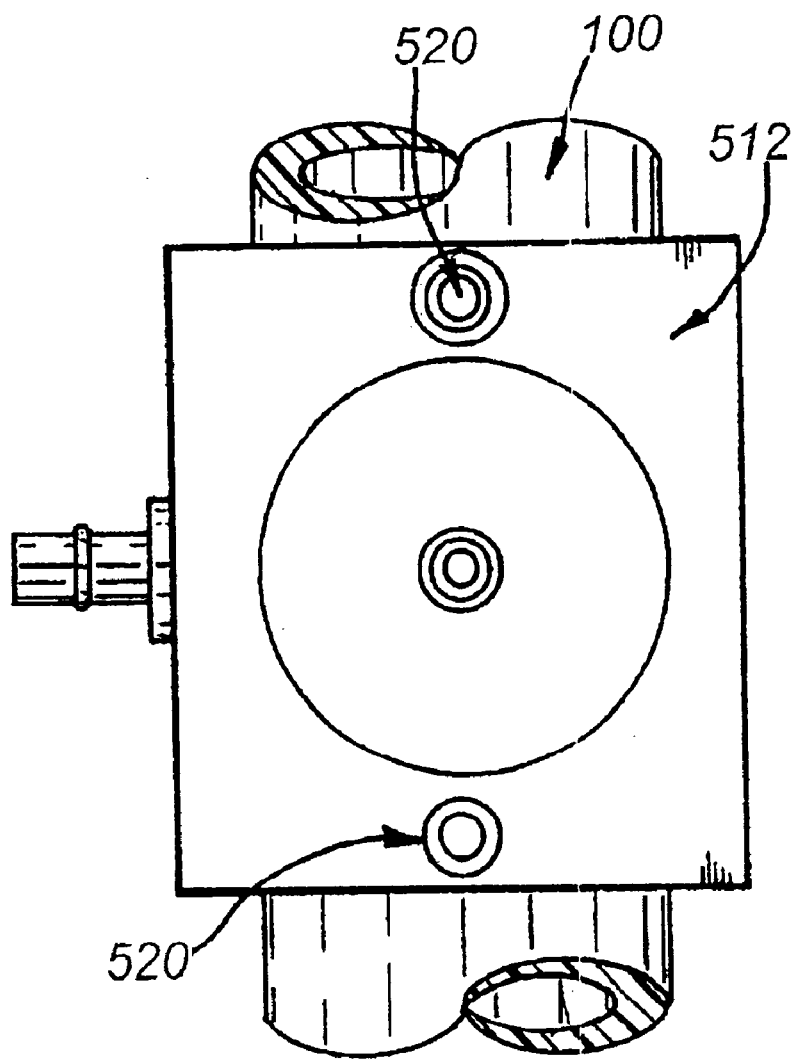
FIG. 5b is a top view of the alternative combination tap.
Figure 5C:
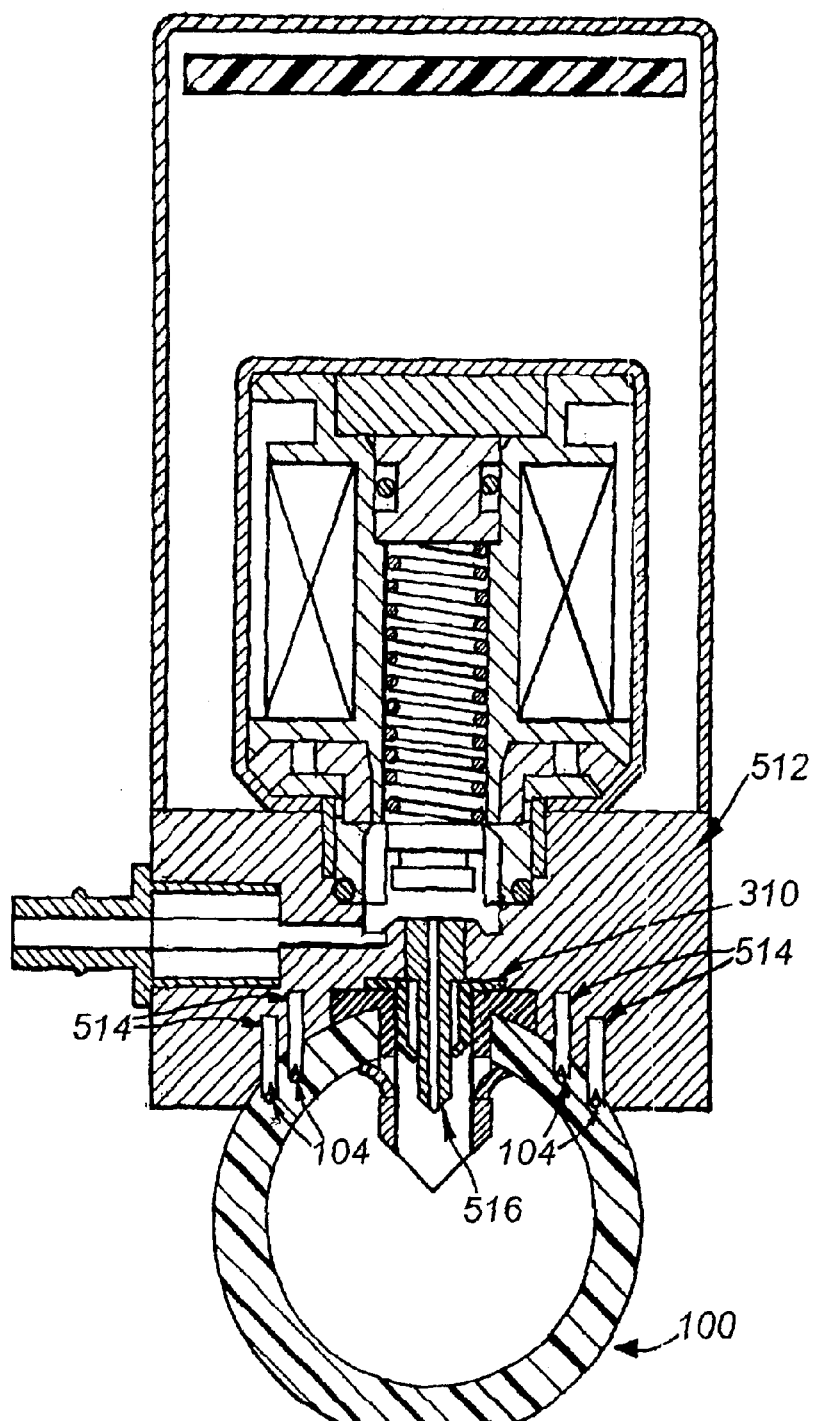
FIG. 5c is a cross-sectional view of the combination tap showing the bracket with the flow probe in more detail.
Figure 5D:
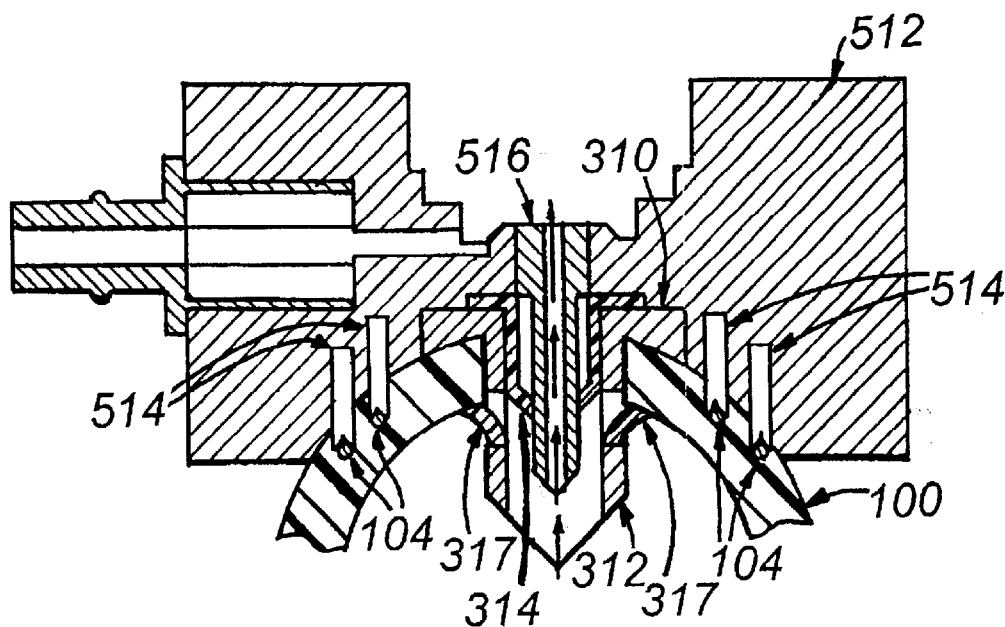
FIG. 5d is another view of FIG. 5c showing the needle in more detail.
Figure 5E:
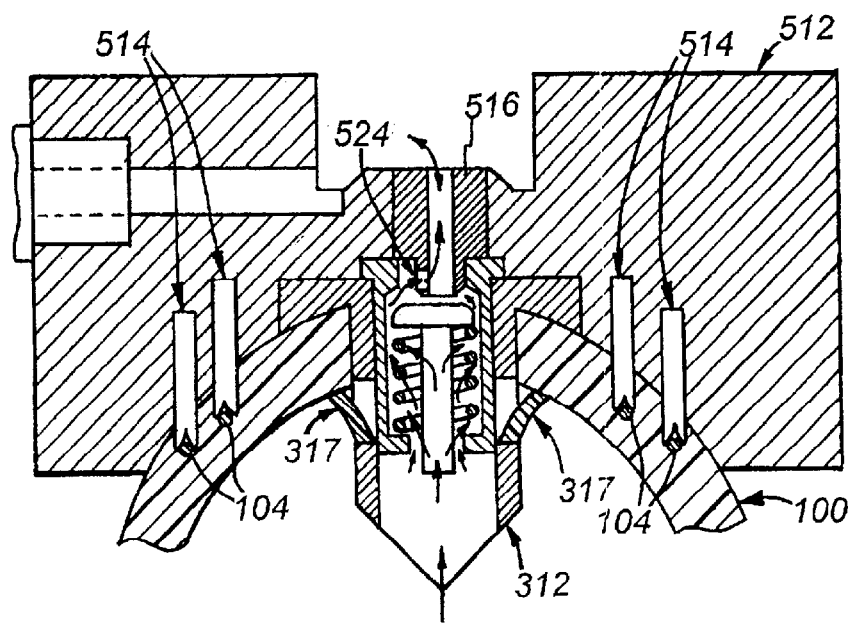
FIG. 5e is a view similar to FIG. 5e but depicting a different type of check valve.

As FIG. 5e illustrates, the check valve does not have to be of the duck-bill type. For example, FIG. 5e illustrates the use of a spring-loaded check valve of the type available, for instance, from WPM Neoperl of Waterbury, Conn. As FIG. 5d does, FIG. 5e shows the needle 516 as having unseated a check valve so that the tap passage extends into communication with the main conduit. The check valve in this case employs a valve member 518 so loaded by a bias spring 522 as to keep fluid from leaving the main passage through the tap passage when it has not been thus unseated. Since the valve member may otherwise obstruct access to the needle 516's interior passage, the needle 516 may form a side port 524.

If the positions of tap locations along the main conduit 100 later need to be changed, the combination tap's upper assembly 512 can simply be removed from the flow probe 312 and bracket 310, which stay on the conduit 100. The upper assembly 512's removal withdraws the needle 516 from the check valve 314, allowing it again to prevent fluid from escaping through the flow probe 312. A new probe and bracket are then installed at the new location, and the old upper assembly 512 can be reused.

Turning back to FIG. 1, note that the main conduit 100 has a configuration in which the electrical conductors 104 spiral along the walls of the conduit. Such an arrangement may be preferred when some of the electrical conductors 104 act as heating wires to heat the fluid; the spiraling configuration aids in the uniform distribution of heat to the fluid. In this configuration, the main conduit's outer-surface notch 102 spirals with the spiral of the electrical conductors 104 so that the tap electrical conductors 204 (see FIGS. 2a–2b) may align with the main-conduit electrical conductors 104. In other embodiments, the spiral is unnecessary, so the notch and conductors may instead be straight, extending parallel to the main conduit's axis.

Figure 6:
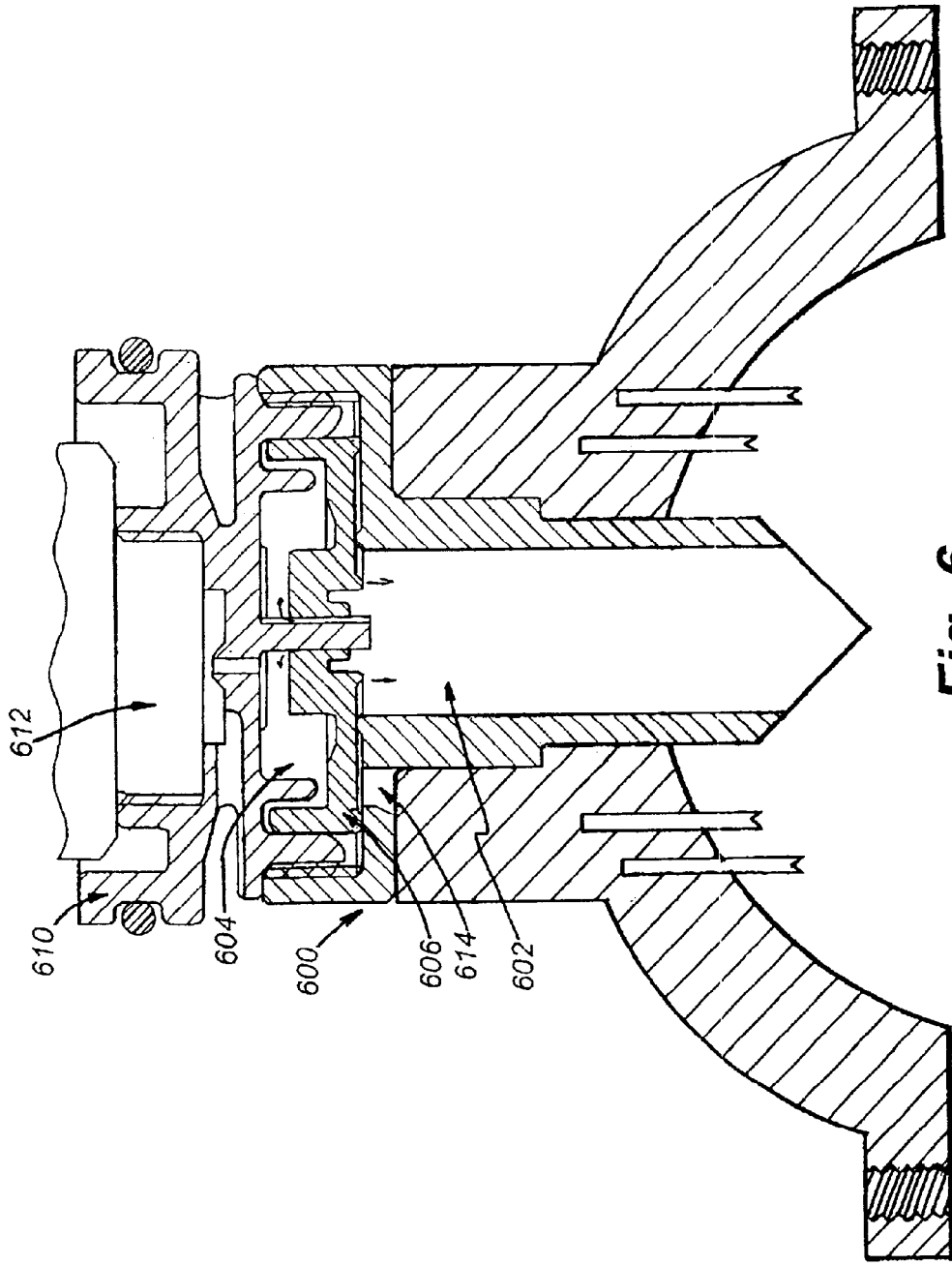
FIG. 6 is a cross-sectional view of a combination tap using a pilot-valve module.

FIG. 6 is a combination tap assembly 600 having a pilot valve control module 610 that may be used to control a liquid such as water tapped from the main conduit. The installation of the tap assembly 600 is similar to those described in the previous drawings. The pilot valve operates as follows: Fluid under pressure in the main passage 602 bleeds through a high-flow-resistance orifice 603 and into a chamber 604 located at the combination tap 600. When the chamber 604 is full, passage 602's pressure prevails in chamber 604.

Because the resultant pressure in the chamber 604 acts downward on a diaphragm 606 over a surface area that is greater than that over which the same pressure acts upward from the main passage 602, the diaphragm 606 seats on an annular valve seat 607 and thereby prevents the release of fluid from the main passage 602 until the pressure is relieved in the chamber 604. To relieve chamber 604's pressure, the pilot-valve solenoid 612, acting in response to control signals, withdraws pilot-valve member 616 from its seat 618 and thereby permits fluid in the chamber 604 to flow through a pressure-relief passages 619, 620, and 621, which offer much less flow resistance than chamber 604's input orifice 603. Because of the resultant pressure drop in the pilot chamber 604, the force from passage 602's pressure lifts the diaphragm 606 off its seat 607, allowing flow from passage 602 through outlet 614.

An improved system for installation and tapping into a fluid, electrical power and control signals in a conduit has been described. It will however be apparent that other variations and modifications may be made to the described embodiments, with the attainment of some or all of their advantages. Therefore, it is the object of the appended claims to cover all such variations and modifications that come within the true spirit and scope of the invention.

What is claimed is:

1. A combination junction comprising:
   A) a main conduit having at least one main passage defined by a main-conduit wall to a surface of which at least one main electrical conductor insulated by insulating material is secured; and
   B) a combination tap comprising:
      i) a body;
      ii) an attachment mechanism operable to secure the body to the main conduit;
      iii) a tap conduit provided by the body and forming at least one tap passage associated with a respective said main passage and entering into communication therewith when the attachment mechanism is operated to secure the body to the main conduit; and
      iv) at least one tap electrical conductor provided by the body, associated with a respective said main electrical conductor, and terminating in a respective insulation-piercing tip so disposed as to pierce the insulating material and make electrical contact with the respective main conductor when the attachment mechanism is operated to secure the body to the main conduit.

2. A combination junction as defined in claim 1 wherein:
   A) the combination tap includes a flow probe so shaped and positioned as to create a flow-tap opening by piercing the main conduit wall when the body is being secured to the main conduit; and
   B) the tap passage extends through the flow probe when the body has been secured to the main conduit.

3. A combination junction as defined in claim 2 wherein the flow probe forms a flow-probe passage therethrough in which is disposed a check valve that prevents flow through the flow-probe passage in the direction away from the main passage.

4. A combination junction as defined in claim 3 wherein the check valve is a duck-bill check valve having resilient lips that form a slit that tends to close against flow through the flow-probe passage in the direction away from the main passage but permits extension of the tap conduit therethrough.

5. A combination junction as defined in claim 1 wherein at least one said main electrical conductor is embedded in the main-conduit wall.

6. A combination junction as defined in claim 5 wherein the insulating material is the conduit wall.

7. A combination junction as defined in claim 1 further including a valve so interposed in the tap conduit as to control flow therethrough.

8. A combination junction as defined in claim 7 wherein the valve is a latching valve, which requires power to change between its open and closed states but requires no power to remain in either state.

9. A combination junction as defined in claim 7 wherein the valve is operable, by application of power supplied through at least one said tap electrical conductor, between open and closed states, in which it respectively permits and prevents fluid flow through the tap conduit.

10. A combination junction as defined in claim 9 wherein the valve is a latching valve, which requires power to change between its open and closed states but requires no power to remain in either state.

11. A combination junction as defined in claim 7 further comprising a valve-drive circuit responsive to application thereto of valve-control signals to operate the valve between its open and closed states by controlling application thereto of the power supplied to the valve-drive circuit.

12. A combination junction as defined in claim 11 wherein the valve is a latching valve, which requires power to change between its open and closed states but requires no power to remain in either state.

13. A combination junction as defined in claim 11 wherein the combination junction further includes a sensor that applies the valve-control signals to the control circuit.

14. A combination junction as defined in claim 13 wherein the sensor is an object sensor that monitors a target region for objects and applies the valve-control signals to the control circuit in response to predetermined characteristics of objects thereby detected.

15. A combination junction as defined in claim 11 wherein the valve-drive circuit receives the valve-control signals through at least one said tap electrical conductor.

16. A combination junction as defined in claim 11 wherein the valve-drive circuit receives through at least one said tap electrical conductor the power whose application to the valve the valve-drive circuit controls.

17. A combination junction as defined in claim 16 wherein the valve-drive circuit receives the valve-control signals through at least one said tap electrical conductor.

18. A combination junction as defined in claim 16 wherein the combination junction further includes a sensor that applies the valve-control signals to the control circuit.

19. A combination junction as defined in claim 18 wherein the sensor is an object sensor that monitors a target region for objects and applies the valve-control signals to the control circuit in response to predetermined characteristics of objects thereby detected.

20. A combination junction as defined in claim 7 wherein at least one said main electrical conductor is embedded in the main-conduit wall.

21. A combination junction as defined in claim 20 wherein the insulating material is the conduit wall.

22. For tapping a main conduit having at least one main passage defined by a main-conduit wall, to a surface of which at least one main electrical conductor insulated by insulating material is secured, a combination tap comprising
   A) a body;
   B) an attachment mechanism operable to secure the body to the main conduit;
   C) a tap conduit provided by the body and forming at least one tap passage associated with a respective said main passage and entering into communication therewith when the attachment mechanism is operated to secure the combination tap body to the main conduit; and
   D) at least one tap electrical conductor provided by the body, associated with a respective said main electrical conductor, and terminating in a respective insulation-piercing tip so disposed as to pierce the insulating material and make electrical contact with the respective main conductor when the attachment mechanism is operated to secure the body to the main conduit.

23. A combination tap as defined in claim 22 wherein:
   A) the combination tap includes a flow probe so shaped and positioned as to create a flow-tap opening by piercing the main conduit wall when the body is being secured to the main conduit; and
   B) the tap passage extends through the flow probe when the body has been secured to the main conduit.

24. A combination tap as defined in claim 20 wherein the flow probe forms a flow-probe passage therethrough in which is disposed a check valve that prevents flow through the flow-probe passage in the direction away from the main passage.

25. A combination tap as defined in claim 24 wherein the check valve is a duck-bill check valve having resilient lips that form a slit that tends to close against flow through the flow-probe passage in the direction away from the main passage but permits extension of the tap conduit therethrough.

26. A combination tap as defined in claim 22 further including a valve so interposed in the tap conduit as to control flow therethrough.

27. A combination tap as defined in claim 26 wherein the valve is a latching valve, which requires power to change between its open and closed states but requires no power to remain in either state.

28. A combination tap as defined in claim 26 wherein the valve is operable, by application of power supplied through at least one said tap electrical conductor, between open and closed states, in which it respectively permits and prevents fluid flow through the tap conduit.

29. A combination tap as defined in claim 28 wherein the valve is a latching valve, which requires power to change between its open and closed states but requires no power to remain in either state.

30. A combination tap as defined in claim 26 further comprising a valve-drive circuit responsive to application thereto of valve-control signals to operate the valve between its open and closed states by controlling application thereto of the power supplied to the valve-drive circuit.

31. A combination tap as defined in claim 30 wherein the valve is a latching valve, which requires power to change between its open and closed states but requires no power to remain in either state.

32. A combination tap as defined in claim 30 wherein the combination tap further includes a sensor that applies the valve-control signals to the control circuit.

33. A combination tap as defined in claim 32 wherein the sensor is an object sensor that monitors a target region for objects and applies the valve-control signals to the control circuit in response to predetermined characteristics of objects thereby detected.

34. A combination tap as defined in claim 30 wherein the valve-drive circuit receives the valve-control signals through at least one said tap electrical conductor.

35. A combination tap as defined in claim 30 wherein the valve-drive circuit receives through at least one said tap electrical conductor the power whose application to the valve the valve-drive circuit controls.

36. A combination tap as defined in claim 35 wherein the valve-drive circuit receives the valve-control signals through at least one said tap electrical conductor.

37. A combination junction as defined in claim 36 wherein the combination junction further includes a sensor that applies the valve-control signals to the control circuit.

38. A combination junction as defined in claim 37 wherein the sensor is an object sensor that monitors a target region for objects and applies the valve-control signals to the control circuit in response to predetermined characteristics of objects thereby detected.

39. For creating a combination junction, a method comprising:
   A) providing a main conduit having at least one main passage defined by a main-conduit wall to a surface of which at least one main electrical conductor insulated by insulating material is secured;
   B) piercing the main-conduit wall to create a flow-tap opening therethrough; and
   C) attaching to the main conduit a combination tap that includes a body, a tap conduit provided by the body and forming a tap passage that enters into communication through the flow-tap opening with the main passage when the combination tap is being attached to the main conduit, and at least one tap electrical conductor provided by the body, associated with a respective said main electrical conductor, and terminating in a respective insulation-piercing terminal so disposed as to pierce the insulating material when the body is being attached to the main conduit and thereby make electrical contact with the respective main conductor.

40. A method as defined in claim 39 wherein:
   A) the combination tap includes a flow probe so shaped and positioned as to pierce the main conduit wall when the body is being secured to the main conduit; and
   B) the step of creating a flow-tap opening includes employing the flow probe to pierce the main conduit wall as the body is being secured.

41. A method as defined in claim 40 wherein the step of creating a flow-tap opening includes piercing the main-conduit wall with a flow probe through which, when the body has been secured to the main conduit, the tap passage extends.

42. A method as defined in claim 41 wherein the flow probe forms a flow-probe passage therethrough in which is disposed a check valve that tends to prevent flow through the flow-probe passage in the direction away from the main passage.

43. A method as defined in claim 42 wherein the check valve is a duck-bill check valve having resilient lips that form a slit that tends to close against flow through the flow-probe passage in the direction away from the main passage but permits extension of the tap conduit therethrough.

44. A method as defined in claim 39 wherein the combination tap is attached to the main conduit by first attaching the flow probe to the main conduit and thereby creating the flow-tap opening and then attaching the tap conduit to the flow probe.

45. A method as defined in claim 39 further including the step of employing a pressurized-gas source to pressurize at least one said main passage.

46. A method as defined in claim 45 further including:
A) providing a pneumatic-conveyor system including at least one gas-input port and a respective conveyor roller derivable by introduction of pressurized gas into that gas-input port; and
B) placing at least one said gas-input port into fluid communication with at least one said tap passage.

47. A method as defined in claim 39 wherein at least one said main electrical conductor is embedded in the main-conduit wall.

48. A method as defined in claim 47 wherein the insulating material is the conduit wall.

49. A method as defined in claim 39 wherein the combination tap includes a valve associated with each of at least one tap passage and so interposed in the associated tap passage as to control flow therethrough.

50. A method as defined in claim 49 wherein the valve is a latching valve, which requires power to change between its open and closed states but requires no power to remain in either state.

51. A method as defined in claim 49 wherein at least one said valve is operable, by application of power supplied through at least one said tap electrical conductor, between open and closed states, in which it respectively permits and prevents fluid flow through the tap passage associated therewith.

52. A method as defined in claim 51 wherein the valve is a latching valve, which requires power to change between its open and closed states but requires no power to remain in either state.

53. A method as defined in claim 51 further including the step of employing an electric-power source to apply electrical power to at least one said main electrical conductor.

54. A method as defined in claim 49 wherein the claim assembly further includes a valve-drive circuit responsive to application thereto of valve-control signals to operate at least one said valve between its open and closed states by controlling application thereto of the power supplied to the valve-drive circuit.

55. A method as defined in claim 54 wherein the valve is a latching valve, which requires power to change between its open and closed states but requires no power to remain in either state.

56. A method as defined in claim 54 wherein the combination tap further includes a sensor that applies the valve-control signals to the control circuit.

57. A method as defined in claim 56 wherein the sensor is an object sensor that monitors a target region for objects and applies the valve-control signals to the control circuit in response to predetermined characteristics of objects thereby detected.

58. A method as defined in claim 54 wherein the valve-drive circuit receives the valve-control signals through at least one said tap electrical conductor.

59. A method as defined in claim 58 further including the step of providing a control-signal source that applies valve-control signals to at least one said main electrical conductor.

60. A method as defined in claim 54 wherein the valve-drive circuit receives through at least one said tap electrical conductor the power whose application to the valve the valve-drive circuit controls.

61. A method as defined in claim 60 further including the step of employing an electric-power source to apply electrical power to at least one said main electrical conductor.

62. A method as defined in claim 60 wherein the valve-drive circuit receives the valve-control signals through at least one said tap electrical conductor.

63. For creating a junction in a main conduit that includes a main-conduit wall that forms a main passage, a method comprising:
A) creating a flow-tap opening through the main-conduit wall by attaching thereto a flow probe, through which a flow-probe passage extends, that so pierces the main wall when it is being attached thereto that the flow-probe passage communicates with the main passage when the flow probe has pierced the main-conduit wall, a check valve being so disposed in the flow-probe passage as to tend to prevent flow through the flow-probe passage in the direction away from the main passage; and
B) attaching to the flow probe a tap conduit that forms a tap passage so that the tap passage extends into the flow-probe passage and the tap conduit holds the check valve open, whereby the tap conduit causes the check to permit flow through the flow-probe passage in the direction away from the main passage and into the tap passage when the flow probe has been attached to the main conduit.

64. A method as defined in claim 63 wherein the check valve is a duck-bill check valve having resilient lips that form a slit that tends to close against flow through the flow-probe passage in the direction away from the main passage but permits extension of the tap conduit therethrough.

65. A method as defined in claim 63, further comprising so removing the tap conduit from the flow probe as to permit the check valve to close and thereby prevent flow through the flow-probe passage in the direction away from the main passage.

66. A method as defined in claim 65 wherein the check valve is a duck-bill check valve having resilient lips that form a slit that tends to close against flow through the flow-probe passage in the direction away from the main passage but permits extension of the tap conduit therethrough.

67. A method as defined in claim 65 wherein the tap conduit is attached to the flow probe before the flow probe is attached to the main conduit.

68. A method as defined in claim 65 wherein the tap conduit is attached to the flow probe after the flow probe is attached to the main conduit, whereby the check valve prevents prevent flow through the flow-probe passage in the direction away from the main passage until the tap conduit is attached.

69. A method as defined in claim 63 wherein the tap conduit is attached to the flow probe before the flow probe is attached to the main conduit.

70. A method as defined in claim 69 wherein the check valve is a duck-bill check valve having resilient lips that form a slit that tends to close against flow through the flow-probe passage in the direction away from the main passage but permits extension of the tap conduit therethrough.

71. A method as defined in claim 63 wherein the tap conduit is attached to the flow probe after the flow probe is attached to the main conduit, whereby the check valve prevents prevent flow through the flow-probe passage in the direction away from the main passage until the tap conduit is attached.

72. A method as defined in claim 71 wherein the check valve is a duck-bill check valve having resilient lips that form a slit that tends to close against flow through the flow-probe passage in the direction away from the main passage but permits extension of the tap conduit therethrough.

* * * * *